(12) United States Patent  
Lin (10) Patent No.: US 10,371,205 B2  
(45) Date of Patent: Aug. 6, 2019

(54) TIDAL CURRENT ENERGY GENERATING DEVICE (71) Applicant: ZHEJIANG ZHOUSHAN LHD ENERGY DEVELOPMENT CO., LTD., Zhoushan (CN)

(72) Inventor: Dong Lin, Hangzhou (CN)

(73) Assignee: ZHEJIANG ZHOUSHAN LHD ENERGY DEVELOPMENT CO., LTD., Zhoushan (CN)

( * ) Notice: Subject to any disclaimer, the term of this patent is extended or adjusted under 35 U.S.C. 154(b) by 390 days.

(21) Appl. No.: 15/541,372

(22) PCT Filed: Jun. 30, 2015

(86) PCT No.: PCT/CN2015/083005  
§ 371 (c)(1),  
(2) Date: Jul. 1, 2017

(87) PCT Pub. No.: WO2016/000610  
PCT Pub. Date: Jan. 7, 2016

(65) Prior Publication Data  
US 2018/0023625 A1   Jan. 25, 2018

(30) Foreign Application Priority Data  
Jun. 30, 2014   (CN) .......................... 2014 1 0309411

(51) Int. Cl.  
*F03B 13/26* (2006.01)  
*F16C 33/10* (2006.01)  
(Continued)

(52) U.S. Cl.  
CPC ......... *F16C 33/1055* (2013.01); *F01M 11/12* (2013.01); *F03B 11/06* (2013.01);  
(Continued)

(58) Field of Classification Search  
CPC ........ F03B 11/06; F03B 13/00; F03B 13/264; F16C 17/12; F16C 33/055; F16C 2380/26;  
(Continued)

(56) References Cited

U.S. PATENT DOCUMENTS 3,993,913 A * 11/1976 Dickman .................. E02B 9/08  
290/53  
4,468,153 A * 8/1984 Gutierrez Atencio .. F03B 13/08  
290/52  
(Continued)

FOREIGN PATENT DOCUMENTS

CN   102359599 A   2/2012  
CN   102892957 A   1/2013  
(Continued)

*Primary Examiner* — Igor Kershteyn  
(74) *Attorney, Agent, or Firm* — Schwegman Lundberg & Woessner, P.A.

(57) ABSTRACT

A tidal current energy generating device includes an outer frame (1), at least one inner frame (2), at least two hydro turbines (3), at least one center shaft (4), at least one generator (5), and at least three bearings (6). The at least one inner frame (2) is separably disposed in the outer frame (1). At least two hydro turbines (3) are located below a water surface and are disposed in one inner frame (2). At least two hydro turbines (3) are disposed coaxially and are vertical-axis hydro turbines. At least one center shaft (4) is disposed through the at least two hydro turbines (3), the axis direction of the center shaft is perpendicular to the horizontal plane, and the center shaft (4) rotates along with the rotating of the hydro turbines (3). The at least one generator (5) is located above the water surface and connected with one end of the center shaft (4). The at least three bearings are sleeved on the center shaft (4) and are located on two sides of and between the two hydro turbines (3), respectively. The tidal current energy generating device can be modularly assembled and (Continued)

replaced above the water surface and can extend along the water depth direction, thereby improving the power generating efficiency.

8 Claims, 6 Drawing Sheets

(51) Int. Cl.
  *F16C 17/12* (2006.01)
  *F16N 7/02* (2006.01)
  *F03B 13/00* (2006.01)
  *F01M 11/12* (2006.01)
  *F03B 11/06* (2006.01)
  *F03B 13/10* (2006.01)
  *H02K 7/18* (2006.01)

(52) U.S. Cl.
  CPC ............ *F03B 13/00* (2013.01); *F03B 13/10* (2013.01); *F03B 13/264* (2013.01); *F16C 17/12* (2013.01); *F16N 7/02* (2013.01); *H02K 7/1823* (2013.01); F05B 2220/32 (2013.01); F05B 2220/706 (2013.01); F05B 2240/12 (2013.01); F05B 2240/50 (2013.01); F05B 2240/57 (2013.01); F05B 2240/60 (2013.01); F05B 2240/97 (2013.01); F05B 2250/12 (2013.01); F05B 2250/141 (2013.01); F05B 2260/98 (2013.01); F16C 2380/26 (2013.01); Y02E 10/28 (2013.01)

(58) Field of Classification Search
  CPC ........ F16N 7/02; H02K 7/1833; F01M 11/12; F05B 2220/32; F05B 2220/706; F05B 2240/12; F05B 2240/50; F05B 2240/57; F05B 2240/60; F05B 2240/97; F05B 2250/12; F05B 2250/141; F05B 2260/98; Y02E 10/28

See application file for complete search history.

(56) References Cited

U.S. PATENT DOCUMENTS

| | | | | |
|---|---|---|---|---|
| 4,717,832 | A | * | 1/1988 | Harris .................. F03B 13/264 290/43 |
| 4,804,855 | A | * | 2/1989 | Obermeyer ............ F03B 13/08 290/43 |
| 5,825,094 | A | * | 10/1998 | Hess ..................... F03B 13/105 290/54 |
| 6,856,036 | B2 | * | 2/2005 | Belinsky ............... F03B 17/063 290/42 |
| 7,352,074 | B1 | * | 4/2008 | Pas ........................ B63B 21/50 290/43 |
| 7,902,687 | B2 | * | 3/2011 | Sauer ..................... F03B 13/12 290/54 |
| 2011/0049896 | A1 | * | 3/2011 | Burger .................... E01D 1/00 290/53 |

FOREIGN PATENT DOCUMENTS

| | | |
|---|---|---|
| CN | 203230522 U | 10/2013 |
| CN | 103807590 A | 5/2014 |
| JP | 2013181430 A | 9/2013 |

\* cited by examiner

TIDAL CURRENT ENERGY GENERATING DEVICE

TECHNOLOGY FIELD

This invention relates to a generating device and, more particularly, to a tidal current energy generating device.

BACKGROUND ART

Ocean energy (including tidal energy, tidal current energy, ocean wave energy, and ocean current energy) refers to mechanical energy generated by the flowing of sea water. As a kind of renewable energy, the ocean energy has great development prospect and value due to its abundant reserve and wide distribution. The primary use of the ocean energy is for power generation. The working principle of ocean energy power generation is similar to that of wind power generation and conventional hydropower generation. That is, the mechanical energy of the sea water is converted into electric energy by energy conversion devices. Specifically, at first, the sea water impacts hydro turbines, the hydro turbines convert the energy of the water flow into the mechanical energy of rotation, and then the hydro turbines drive power generators to generate power via mechanical drive systems, thereby finally converting the mechanical energy to the electric energy.

Nowadays, with the increasing shortage of energy and the increasing serious green house effect, energy is required to be low-carbon. Thus, clean energy, such as wind energy and the ocean energy, is the future direction of energy development. However, the power generating devices for the clean energy are still developing, and the utilization of the ocean energy is still in an initial stage, except the relatively mature wind energy utilization. No general-purpose and proven devices are available. The efficiency is relatively low, and it is difficult to realize large-scale devices.

Since the ocean environment is complicated and the water resistance is large, the installation of the conventional ocean energy power generator in the ocean has great difficulties and needs large costs. In addition, since the power generator contacts the sea water over a long period of time, under long corrosion and huge impaction of the sea water, the ocean energy power generator needs regular maintenance or replacement after being used for a period of time. However, the maintenance and replacement of the conventional ocean energy power generator are also carried out in the ocean, and thus the difficulty is high and the cost is huge. Even the whole ocean energy power generator will be scraped only due to the damage of some components, which is one important reason causing the high cost of the ocean energy power generator and is also a direct reason causing the conventional ocean energy power generator failing to realize large-scale and commercialized operation. However, those skilled in the ocean energy power generating field have overlooked the improvement of the modes of installing and repairing.

In addition, the conventional ocean energy power generator generally only includes one or two vertical-axis hydraulic generators. To improve generating power, the diameter and the length along the water depth direction of the impeller of the hydro turbine usually need to be as large as possible. However, limited by the manufacturing materials and the environmental conditions, the existing vertical-axis hydro turbine is impossible to be large and deep enough. The deepest depth that the known vertical-axis hydro turbine can reach in the sea is only 5-6 meters under the sea surface. The scale of the whole ocean energy power generator is severely limited, the generating power cannot meet the demand, and the cost of power generator is high and cannot be reduced.

However, at present, the technical persons in the ocean energy power generating field have technical bias, only focusing on how to enlarge the impeller of the hydraulic generator or how to improve the structure of blades of the impeller further to improve the generating power of the single hydraulic generator. At present, no persons in the field research how to improve the generating power and to reduce the costs to facilitate commercialization on the premise that the impeller is not changed.

On the other hand, only one vertical-axis hydro turbine can be disposed in the water depth direction (the direction perpendicular to the horizontal surface) for the existing ocean energy generating device. The reason thereof is not only that the vertical-axis hydro turbine cannot be made long enough in the depth direction as mentioned above, but also that the center shaft of the vertical-axis hydro turbine cannot go deep enough into the ocean. If the center shaft is made to be very long in prior art, it is likely to be deformed or even broken because of the huge impact force of the sea, and thus the whole generating device cannot be used. In addition, those skilled in the art have ignored the protection on the center shaft by the bearings. Usually, the center shaft of the conventional ocean generating device is protected by only one bearing or at most two bearings.

Sealing of the bearing is one of the most important indicators to determine working performance of the bearing. In the prior art, a method of adding seal rings is widely used to improve the sealing of the bearings. Both the shaft used on land and the shaft used in a submarine or a steamship are subject to the external force exerted in the axial direction. Therefore, the conventional seal ring is sufficient to meet the sealing requirement of the conventional bearing.

However, for the generating device utilizing ocean energy, especially tidal current energy, to generate electricity, the center shaft thereof bears a huge impact force exerted by the water flow in the radial direction. After a period of time, the seal ring between the center shaft and the conventional bearing is easily deformed, and the sealing of the bearing cannot be ensured. Since the problem of high sealing requirements cannot be solved, the existing ocean energy generating device has to abandon rolling bearings with the oil as a lubricant and can choose sliding bearings which use the water as the lubricant. However, those skilled in the art have ignored one problem. The water that can be used as the lubricant must be pure water. In other words, as the water flow usually contains a lot of sediments, if the external water carrying impurities such as sediments flows into the bearing because of the elastic deformation of the sealing rings, not only cannot achieve the lubrication effect to the bearing, but also the normal work of the center shaft is affected, and ultimately the generating efficiency of the generating device is affected.

Therefore, besides the above mentioned problems of installation, maintenance and the length limitation of the center shaft, the conventional ocean energy power generator also usually encounters a problem that the shafting (including the center shaft and the bearing) needs to be replaced, which leads to a higher cost.

SUMMARY OF THE INVENTION

To overcome at least one deficiency in the prior art, this invention provides a tidal current energy generating device.

To achieve the above objective, this invention provides a tidal current energy generating device, including an outer frame, at least one inner frame, at least two hydro turbines, at least one center shaft, at least one generator and at least three bearings. At least one inner frame is separably disposed in the outer frame. At least two hydro turbines are located below a water surface and are disposed in one inner frame. At least two hydro turbines are disposed coaxially, and the at least two hydro turbines are vertical-axis hydro turbines. At least one center shaft is disposed through the at least two hydro turbines, the axis direction of the center shaft is perpendicular to a horizontal plane, and the center shaft rotates along with the rotating of the hydro turbines. At least one generator is disposed above the water surface, and the at least one generator is connected with one end of the center shaft. At least three bearings are sleeved on the center shaft, and the at least three bearings are located on two sides of the two hydro turbines and between the two hydro turbines, respectively.

In one embodiment of the invention, the number of the hydro turbines may be at least four, every two hydro turbines disposed coaxially may be a group, at least two groups of the hydro turbines may be disposed in one inner frame, and two neighboring hydro turbines may be disposed axial-symmetrically to make rotating directions of the two hydro turbines to be reverse.

In one embodiment of the invention, the tidal current energy generating device may further comprise an underwater shaft rotating protecting device, wherein the underwater shaft rotating protecting device may comprise a lubricant storage tank, at least six seal rings, and a tube. A lubricant may be stored in the lubricant storage tank, and the lubricant storage tank may be disposed above the water surface. Every two seal rings may correspond to one bearing and may be sleeved on the center shaft, and a lubricant cavity may be formed between every two seal rings and the corresponding bearing and the center shaft. One end of the tube may be communicated with the lubricant storage tank, and the other end may be communicated with the lubricant cavity.

In an embodiment of the invention, the underwater shaft rotating protecting device may further comprise a detection module, the detection module may be disposed at the lubricant storage tank to detect whether the lubricant is reduced or not.

In an embodiment of the invention, the bearing may be a sliding bearing, and every lubricant cavity may be formed by two seal rings, the bearings, and the center shaft.

In an embodiment of the invention, the bearing may be a rolling bearing, the underwater shaft rotating protecting device may further comprise bearing houses, and each lubricant cavity may be formed by two seal rings, the bearings, the bearing houses, and the center shaft.

In an embodiment of the invention, the outer frame may have a plurality of fixed piles, and the outer frame may be fixed at the sea bottom through piling.

In an embodiment of the invention, the outer frame may have a plurality of reducing water flow resistance structures.

To sum up, the tidal current energy generating device in the invention can allow the generating device to be modularly assembled and replaced above the water surface by disposing separable inner frames and the outer frame, such that the costs of maintenance and installation can be greatly reduced, thereby overcoming the difficulties that the conventional ocean energy generating device cannot be commercialized and large-scale. Further, by disposing at least two hydro turbines and at least three bearings on the center shaft, the "multipoint restriction" is achieved for the center shaft, which makes the scale of the tidal current energy generating device can be extended not only in the horizontal direction (the horizontal direction perpendicular to the water flow) but also in the vertical direction (the depth direction perpendicular to the horizontal plane), such that the power generation efficiency is greatly improved and the problem that the existing ocean energy generating devices cannot "be large" and "be deep" is solved.

In addition, the underwater shaft rotating protecting device provided by the invention can effectively protect the bearings from the outer impurities, especially preventing the sediments in the water from entering into the bearings, so as to effectively protect the normal operation of the bearings. By adopting the underwater shaft rotating protecting device, the tidal current energy generating device in the invention extends the service lives of the bearings, the maintenance frequency and maintenance costs are greatly reduced, and the power generating efficiency is ensured not to be affected at the same time. Furthermore, the bearing of the tidal current energy generating device provided by the invention can be a rolling bearing, which overcomes the technical barrier that only sliding bearing with water as the lubricant can be used for an underwater shafting in the prior art.

Moreover, by setting the detection module, whether the sealing of the bearings is reduced or not can be known intuitively and timely, which effectively guides the maintenance personnel when and where to maintain, thereby improving the promptness and reliability of the maintenance. In addition, since the frame includes separable outer frame and inner frame, the underwater shaft rotating protecting device can be maintained or replaced conveniently and quickly, and the maintenance cost is greatly reduced.

These and other features, aspects, and advantages of the present invention will become better understood with regard to the following description, appended claims, and accompanying drawings.

DETAILED DESCRIPTION OF THE INVENTION

Figure 1:
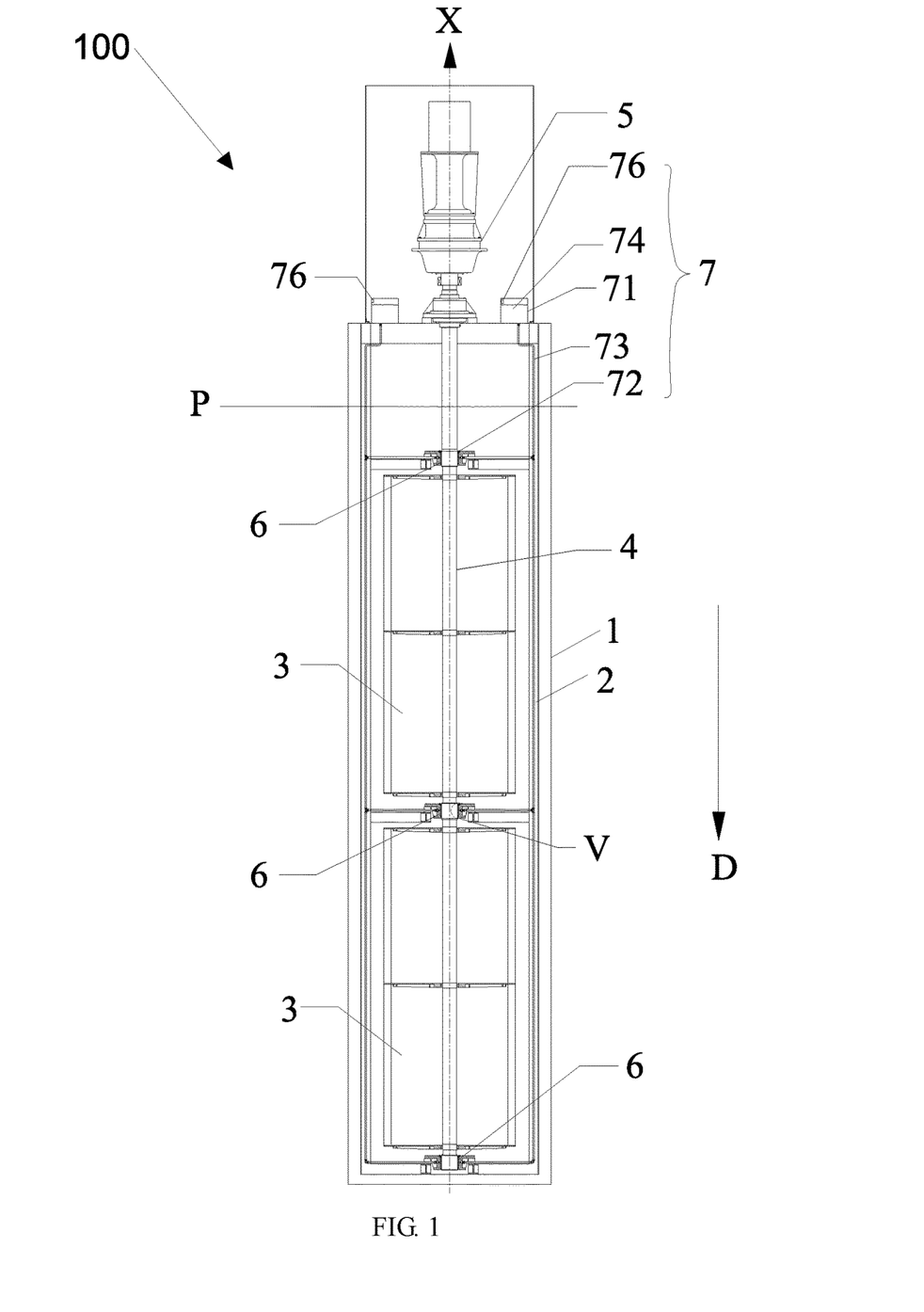
FIG. 1 is a side view of a tidal current energy generating device provided by the first embodiment of the invention.
Figure 2:
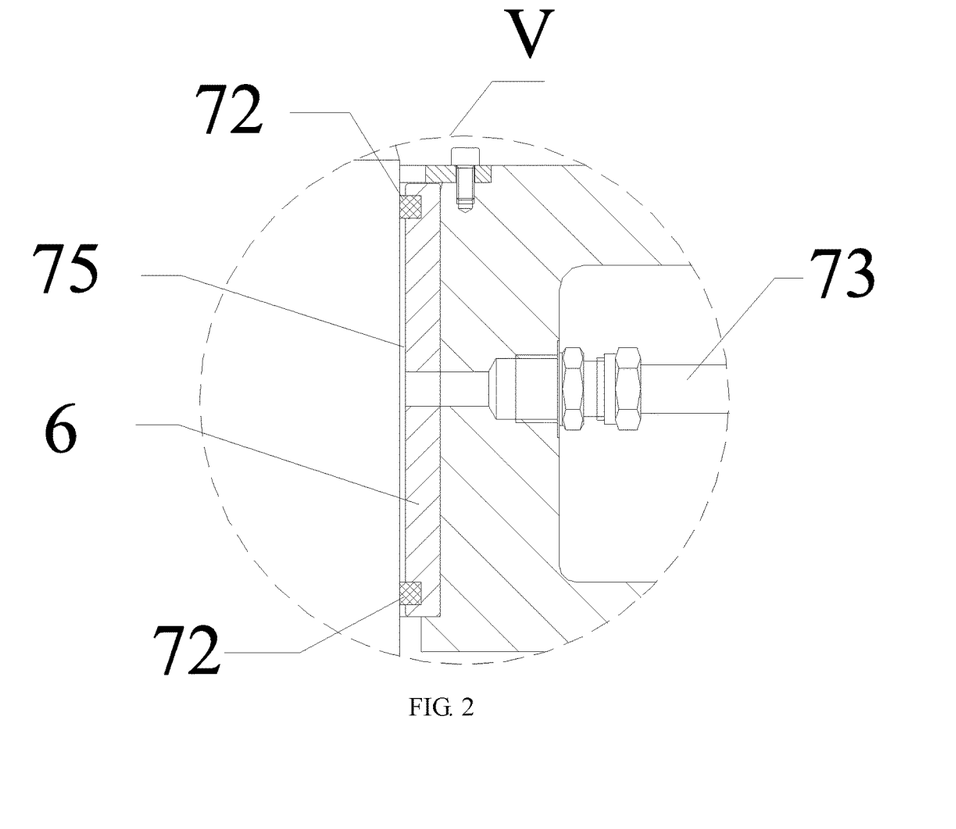
FIG. 2 is an enlarged schematic diagram of the circle mark V in FIG. 1.

FIG. 1 is a side view of the tidal current energy generating device provided by the first embodiment of the invention. FIG. 2 is an enlarged schematic diagram of circle mark V in FIG. 1. Please refer to FIG. 1 and FIG. 2 together.

A tidal current energy generating device 100 in the embodiment includes an outer frame 1, at least one inner frame 2, at least two hydro turbines 3, at least one center shaft 4, at least one generator 5, and at least three bearings 6.

At least one inner frame 2 is separably disposed in the outer frame 1. In the embodiment, a hook may be disposed in the inner frame 2 (not shown in the figure), an engaging slot may be disposed in the outer frame 1 (not shown in the figure), and the inner frame 2 is embedded into the outer frame 1 by the hook and the engaging slot interlocking together. However, the mounting mode of the inner frame 2 and the outer frame 1 in the invention is not limited.

At least one inner frame 2, at least two hydro turbines 3, at least one center shaft 4, at least one generator 5, and at least three bearings 6 form a built-in module. In actual application, at least two hydro turbines 3, at least one center shaft 4, at least one generator 5, and at least three bearings 6 may be disposed in one inner frame 2, and then at least one frame 2 is disposed in the outer frame 1, thus to achieve the modular installation of the tidal current energy generating device 100. In detail, the built-in module can be installed ashore, and then the built-in module 100 is hanged into the outer frame 1 in the ocean and is fixed to the outer frame 1, thereby achieving the installation above the water surface, greatly simplifying installing procedures, reducing installing time, and reducing installing difficulties in the ocean.

Conventional ocean energy generating devices need to be maintained in the sea. Thus, the maintenance is very difficult, and the cost is quite high. However, the built-in module of the tidal current generating device 100 in the invention can be taken out of the sea to be maintained or replaced, thereby realizing quick replacement and maintenance of the tidal current generating device 100 above the water surface and greatly reducing the maintenance cost, such that the commercialization of the tidal current generating device 100 can be realized. By disposing separable inner frame 1 and out frame 2, the invention solves the problem that the installation and maintenance must be performed in the sea in the prior art.

By disposing at least one inner frame detachably in the outer frame, it is possible to break through the drawback that the existing ocean tidal current energy generating device cannot realize a large scale. By now the generating capacity of a single unit of the largest ocean tidal current energy generating device in the world is 1.2 MW, however, the generating capacity of a single unit of the tidal current energy generating device in this invention is 5 MW, which is much higher than the largest generating capacity of the existing ocean tidal current energy generating device.

The at least hydro turbines 3 are located below the water surface and disposed in at least one inner frame. In the invention, the at least two hydro turbines 3 are disposed coaxially, and the two hydro turbines 3 are vertical-axis hydro turbines. As shown in FIG. 1, the hydro turbine whose rotation axis is perpendicular to the horizontal plane P is the vertical-axis hydro turbine.

In detail, "being disposed coaxially" in the invention refers that two hydro turbines 3 are arranged up and down in parallel in the direction as shown in FIG. 1, and the axis of the hydro turbine 3 located on the upper side of FIG. 1 and the axis of the lower hydro turbine 3 are the same straight line. Bend directions of blades of the two coaxially disposed hydro turbines 3 are the same to ensure the rotation directions of the two hydro turbines are the same. However, the number of the hydro turbines 3 is not limited in the invention. In other embodiments, the number of the hydro turbines 3 can be far more than two. By disposing at least two hydro turbines 3 in the depth direction D perpendicular to the horizontal plane P, it is possible to greatly deepen the depth of the tidal power generating device 100 into the sea without increasing the size of the hydro turbines 3, thereby increasing the generation power.

At least one center shaft 4 is disposed through the at least two hydro turbines 3, the axis direction X of the center shaft 4 is perpendicular to the horizontal plane P, and the center shaft 4 rotates along with the rotating of the hydro turbines 3. As the hydro turbine 3 is a centrosymmetric structure itself, the axis direction of the hydro turbine 3 in the invention is the axis direction X of the center shaft 4.

At least one generator 5 is disposed above the water surface, and the at least one generator 5 is connected with one end of the center shaft 4. In actual application, the blades of the hydro turbines 3 are subjected to an impact force of the tidal current thus to rotate. The center shaft 4 and the hydro turbine 3 may be in an interference fit, and the center shaft 4 rotates along with the rotation of the hydro turbine 3. One end of the center shaft 4 and a gear hole of a gear case in the generator 5 form an interference fit. The rotating of the center shaft 4 drives the gear to rotate, and then by the intermeshing between the gears, the mechanical energy is passed to the generator 5 thus to drive the generator 5 to generate electricity.

At least three bearings 6 are sleeved on the center shaft 4, and the three bearings 6 are located on the two sides and between the two hydro turbines 3, respectively. In detail, as shown in FIG. 1, one of the three bearings 6 is disposed between the two hydro turbines 3, and the other two bearings 6 are disposed on the upper and lower sides of the two hydro turbines 3. In the embodiment, the number of the bearings 6 on every center shaft 4 corresponds to the number of the hydro turbines 3 on the same center shaft 4, and the number of the bearings 6 is at least one more than the number of the hydro turbines to ensure that no matter how the number of the hydro turbines 3 increases, there are bearings 6 on both sides of the hydro turbines 3.

By disposing two and more hydro turbines 3 in the depth direction D, the depth of the tidal current energy generating device 100 in the depth direction D can be greatly expanded without increasing the blade length of the hydro turbines 3, such that the tidal current energy can be utilized more efficiently thus to greatly improve the generation power. By disposing at least three bearings 6 to achieve the "multipoint restriction" to the center shaft 4, no matter how long the center shaft 4 is made, under the huge impact force of the sea water, the three bearings 6 share the stress and meanwhile provide the fixing and support for the center shaft 4 by at least three points, which overcomes the technical problems that the center shaft of the ocean energy generating device in the prior art cannot be deep.

In the embodiment, the tidal current energy generating device 100 further includes an underwater shaft rotating protecting device 7, and every underwater shaft rotating protecting device 7 comprises a lubricant storage tank 71, at least six seal rings 72, and a tube 73. The lubricant 74 is stored in the lubricant storage tank 71, and the lubricant storage tank 71 is disposed above the water surface P. Every two seal rings 72 correspond to one bearing 6 and are sleeved on the center shaft 4, and a lubricant cavity 75 is formed between every two seal rings 72 and the corresponding bearing 6 and the center shaft 4. One end of the tube 73 is communicated with the lubricant storage tank 71, and the other end is communicated with the lubricant cavity 75.

In the embodiment, the number of the tubes 73 and the lubricant storage tanks 71 in each built-in module are both two, and the two tubes 73 are communicated with the two sides of the lubricant cavity 75 and the two lubricant storage tanks 71, respectively. The speed of filling with the lubricant 74 is improved by increasing the number of the tubes 73. However, this invention is not limited thereto. In the embodiment, the tube 73 may be made of stainless steel.

In the first embodiment, the bearing 6 is a sliding bearing, every lubricant cavity 75 is formed by two seal rings 72, the bearings 6, and the center shaft 4. In detail, upper and lower surfaces of the lubricant cavity 75 are formed by the two seal rings 72, respectively, the inner surface of the lubricant cavity 75 is the outer surface of the journal portion of the center shaft 4, and the outer surface of the lubricant cavity 75 is the inner surface of the bearing 6. A cross section of the lubricant cavity 75 is annular, and the longitudinal section is a rectangular annular cylinder. The lubricant 74 is filled in the lubricant cavity 75 to form a lubricant film thus to reduce the friction. In the first embodiment, the lubricant 74 is pure sea water without impurities such as sediments and so on.

As the impact force of the tidal current to the hydro turbine 3 is huge, the seal ring 72 is subjected to a huge radial force for a long period of time and is easy to be elastically deformed, which leads to no further sealing between the seal ring 72 and the center shaft 4. That is, a gap is formed between the seal ring 72 and the center shaft 4. Since the lubricant 74 is originally located in the lubricant cavity 75, when a gap exists in the lubricant cavity 75, the lubricant 74 may run off, and meanwhile, the water outside will carry the impurities such as sediments to flow in from the gap.

The following details how the underwater shaft rotating protecting device 7 for tidal current energy generating provided by the embodiment protects the center shaft 4 under the water surface.

Since the lubricant storage tank 71 is located above the water surface P, while the connection section of the hydro turbine 3 and the center shaft 4 is under the water surface P, there is a height difference between them. According to the fluid pressure formula, the pressure is in direct proportion to the depth (the height between the pressure measuring point and the liquid level). Since the lubricant 74 located within the lubricant cavity 75 is conveyed by the tube 73 communicated with the lubricant storage tank 71, in the case that the density is the same, the pressure where the lubricant cavity 75 is communicated with the tube 73 is definitely larger than the outer pressure at the same depth. Meanwhile, as the liquid can transmit the pressure, the inner pressure on the sealing point of the seal ring 72 must be larger than the outer pressure on the sealing point of the seal ring 72. Therefore, the lubricant cavity 75 is always in a state of "micro-positive-pressure".

In other words, even though the sealing between the bearing 6 and the center shaft 4 cannot be realized, namely, a gap exists between the seal ring 72 and the center shaft 4, the lubricant 74 will also continually flow from the lubricant storage tank 71 into the lubricant cavity 75 due to the pressure difference action and then flows from the gap to the outside of the seal ring 72, and the outer water with sediments won't flow into the lubricant cavity 75 from the gap, so that the protection for the center shaft 4 can be truly achieved.

In actual application, the tube 73 further includes a joint, and multichannel configuration can be achieved by the joint, such that the lubricant cavity 75 in the three bearings 6 can share a master route of one tube 73 to communicate the common lubricant storage tank 71. However, this invention is not limited thereto.

In the embodiment, the underwater shaft rotating protecting device 7 for the tidal current energy generating further includes a detection module 76 disposed at the lubricant storage tank 71 to detect whether the lubricant is reduced or not. In actual application, the detection module 76 may be an infrared sensor, detecting whether the height of the lubricant 74 in the lubricant storage tank 71 is reduced or not thus to judge whether the lubricant 74 is reduced. The detection module 76 may also be a gravity sensor, detecting whether the weight of the lubricant 74 in the lubricant storage tank 71 is reduced or not to judge whether the amount of the lubricant 74 changes. The reduction of the lubricant 74 represents a decrease in the sealing performance of the bearing 6, thereby reminding the maintenance personnel that the seal ring 72 has been aged or deformed and needs to be repaired or replaced. By setting the detection module 76, the maintenance personnel can know the states of the shafting intuitively and timely, especially the working state of the seal ring 72, and maintain the tidal current energy generating device 100 in time.

In actual application, the underwater shaft rotating protecting device 7 may further include an alarm module (not shown), and the alarm module is connected with the detection module 76. When the detection module 76 detects that the lubricant 74 decreases, the alarm module raises the alarm.

Figure 3:
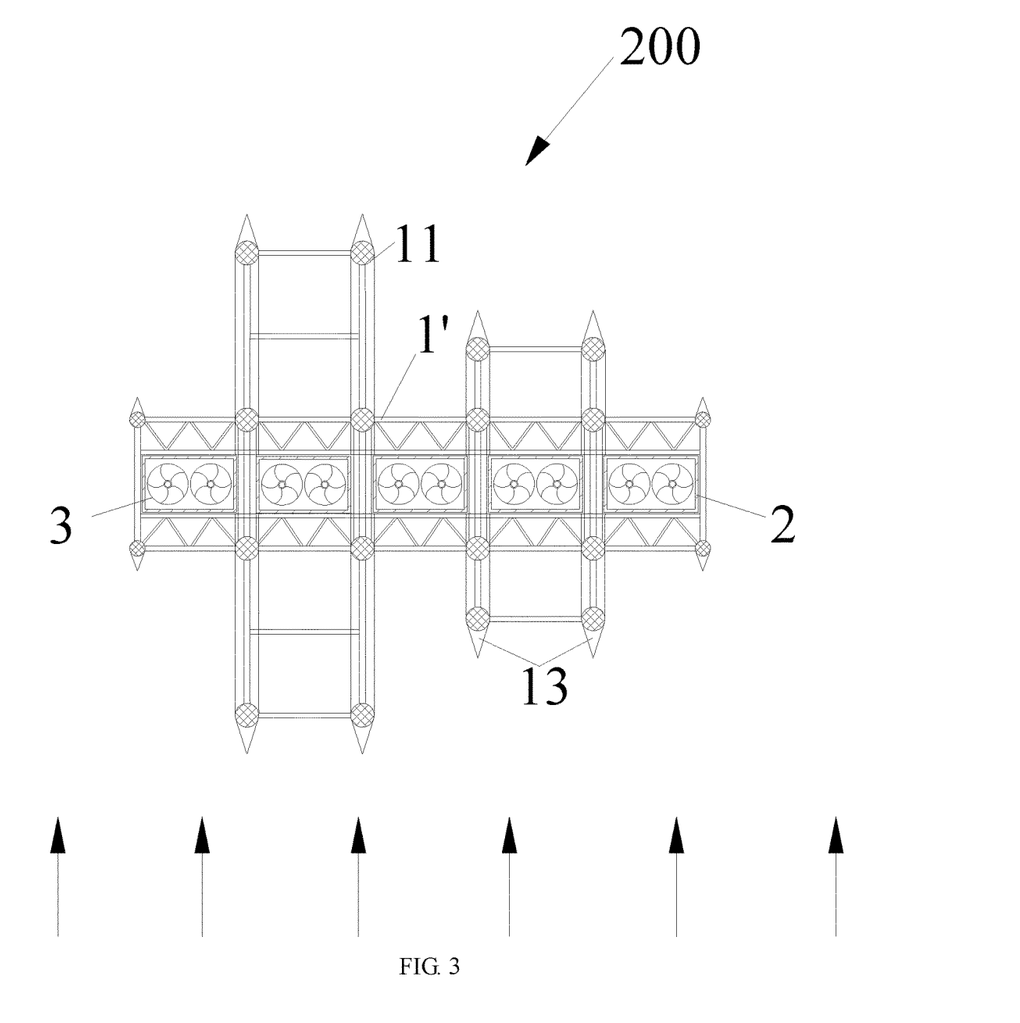
FIG. 3 is a top view of a tidal current energy generating device provided by the second embodiment of the invention.
Figure 4:
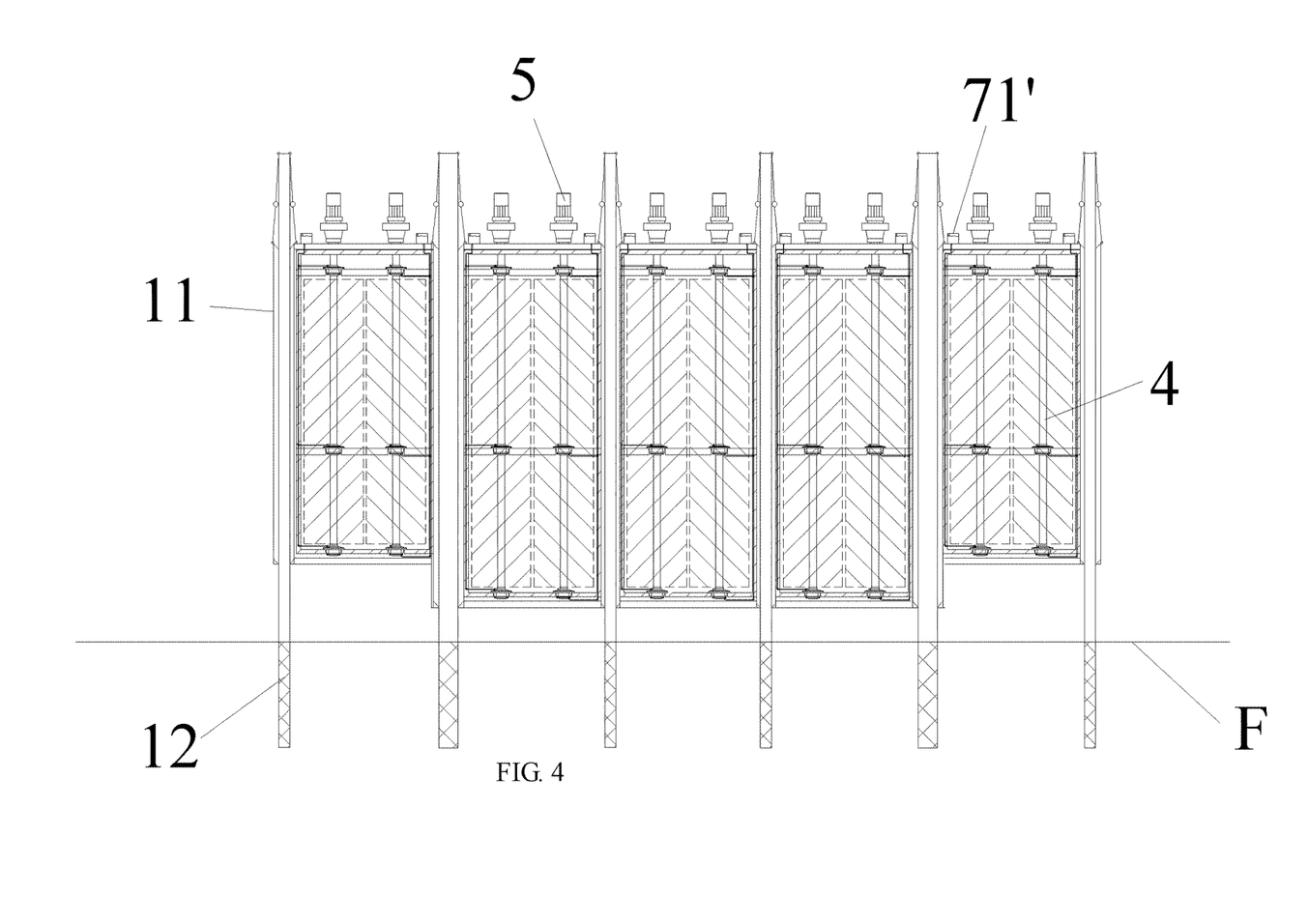
FIG. 4 is a front view of the tidal current energy generating device provided by the second embodiment of the invention.
Figure 5:
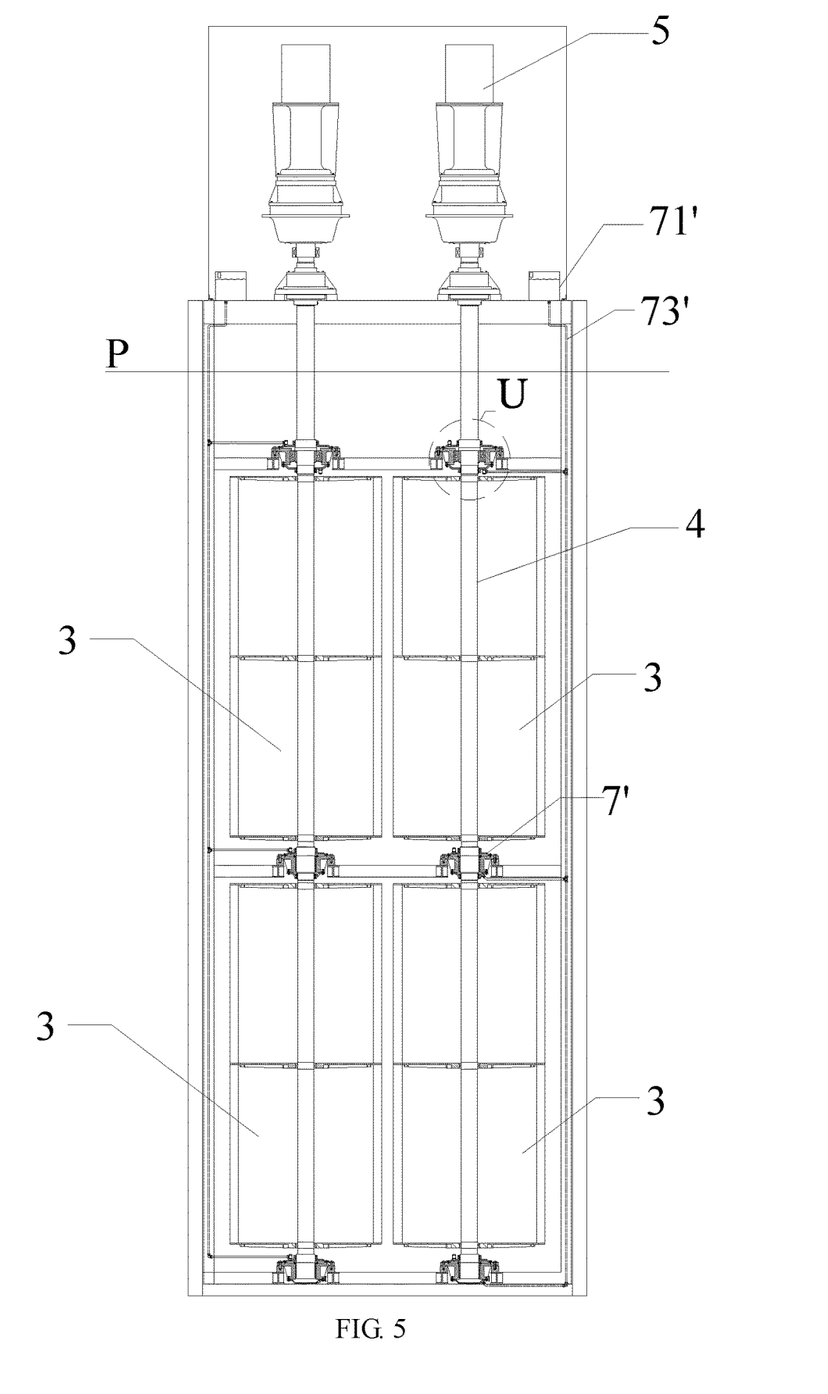
FIG. 5 is a schematic diagram of a built-in module of the tidal current energy generating device provided by the second embodiment of the invention.
Figure 6:
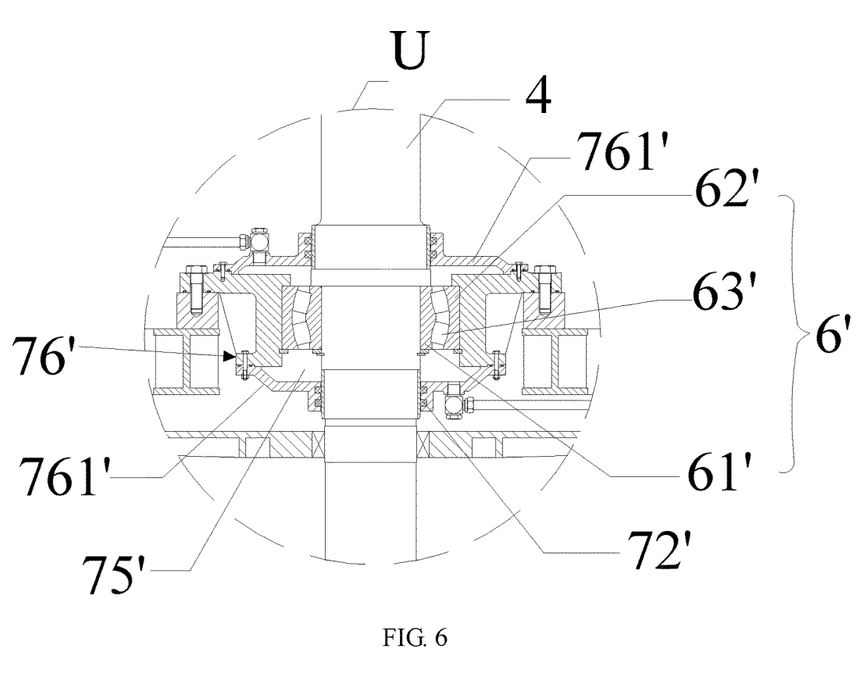
FIG. 6 is an enlarged schematic diagram of the circle mark U in FIG. 5.

FIG. 3 shows the top view of a tidal current energy generating device provided by a second embodiment of the invention. FIG. 4 is a front view of the tidal current energy generating device provided by the second embodiment of the invention. FIG. 5 is a schematic diagram of a built-in module of the tidal current energy generating device provided by the second embodiment of the invention. FIG. 6 is an enlarged schematic diagram of the circle mark U in FIG. 5. Please refer to FIG. 3 to FIG. 6 together.

In the second embodiment, the structures and functions of the outer frame 1, the inner frame 2, the hydro turbine 3, the center shaft 4, and the generator 5 are all the same as those described in the first embodiment, and the same elements are referenced with the same numbers, which are not described herein for a concise purpose. Only the differences are described hereinafter.

An outer frame 1' can be made by welding steel material. In the embodiment, the outer frame 1' includes an outer sleeve 11 and a fixed pile 12. The fixed pipe 12 is formed by pouring of concrete in the outer sleeve 11. The outer frame 1' is fixed at the sea bottom F through piling.

In the embodiment, the outer frame 1' further comprises a plurality of reducing water flow resistance structures 13. The multiple reducing water flow resistance structures 13 are disposed on the upstream side of multiple outer sleeves 11. By setting multiple reducing water flow resistance structures 13 on the upstream side of multiple outer sleeves 11, the stressed area subjected to the water impact of the outer sleeves 11 (the fixed pipes 12 are formed herein later) is greatly reduced, and the stability of the fixed pipes 12 formed later is greatly increased. As shown in FIG. 3, the reducing water flow resistance structures 13 are disposed on the very top and the bottom of the outer frame 1'. In this embodiment, multiple reducing water flow resistance structures 13 and the body of the outer frame 1' are integrally formed.

Take the four outer sleeves 11 in the second column from left in FIG. 3 as an example, as the outer sleeves 11 are arranged as one column parallel to the water flow direction, the flow impact force on the outer sleeves 11 located downstream is greatly reduced after the obstruction of the outer sleeves 11 located upstream. Experiments show that if there's no reducing water flow resistance structure 13, in the case that the current speed does not change, the sum of the flow impact forces on the four outer sleeves 11 is about 2.6 times of the flow impact force on one outer sleeve 11 exposed in the water. However, after disposing the reducing water flow resistance structure 13 at the outer frame 1', the sum of the flow impact forces on the four outer sleeves 11 is only 30% of the flow impact force on one outer sleeve 11 exposed in the water.

In the embodiment, the cross section of the reducing water flow resistance structures 13 is triangle. However, the detailed shape and the construction of the reducing water flow resistance structures 13 are not limited in the invention. In other embodiments, the reducing water flow resistance structures can be made streamlined.

In the embodiment, the number of the hydro turbines 3 is at least four, every two hydro turbines 3 disposed coaxially is one group, at least two groups of the hydro turbines 3 are disposed in one inner frame 2, and two neighboring hydro turbines 3 are disposed axial-symmetrically to make rotating directions of the two hydro turbines to be reverse. Specifically, two groups of the hydro turbines 2 are disposed in arrays side by side, and the bend direction of blades 32 of two neighboring hydro turbines 3 are axisymmetric. As shown in FIG. 3 and FIG. 4, every two hydro turbines 3 are a group and are disposed in parallel, the rotation direction of the left hydro turbine 3 is anticlockwise, and the rotation direction of the right hydro turbine 3 is clockwise. By setting the directions of neighboring hydro turbines to be opposite, the flow is effectively collected and evacuated, the current speed is increased, and the rotation of the hydro turbines 3 are expedited to improve the generating efficiency of the generator 5. However, the number and rotation direction of the hydro turbines 3 are not limited in the invention. Experiments have shown that disposing the neighboring hydro turbines 3 symmetrically can greatly improve the generated power.

In the embodiment, a tidal current energy generating device 200 includes five built-in modules, and every built-in module has one inner frame 2, the corresponding four hydro turbines 3, and six bearings 6'. However, this invention is not limited thereto. The number of the hydro turbines 3 in both the horizontal direction (the horizontal direction as shown in FIG. 4, that is a horizontal direction perpendicular to the current direction) and the vertical direction (the vertical direction as shown in FIG. 4, that is a depth direction perpendicular to the horizontal plane) can be increased according to the power generation demand of the tidal current energy generating device, so that the large scale of the tidal current energy generating device 200 can be realized.

In the second embodiment, the bearing 6' includes an inner ring 61', an outer ring 62', and a rolling element 63'. The inner ring 61' is matched with the center shaft 4 and rotates with the center shaft 4, and the outer ring 62' is matched with a bearing house 76' as the support. The bearing 6' changes the sliding friction between the center shaft and the bearing inside the sliding bearing into the rolling friction of rolling elements 63' between the inner ring 61' and the outer ring 62'.

In the embodiment, an underwater shaft rotating protecting device 7' further comprises three bearing houses 76', a lubricant cavity 75' formed by two seal rings 72', the bearing 6', the bearing house 76' and the center shaft 4, and the rolling elements 63' of the bearing 6' are located inside the lubricant cavity 75'. Specifically, the bearing house 76' in the embodiment further includes two end caps 761'. The end cap 761' can not only have an axial positioning function for the bearing 6', but also have the functions of preventing impurities and sealing with the seal ring 72'. A seal cavity is formed by the two end caps 761' up and down, the seal rings 72', the center shaft 4, and the bearing house 76', and the bearing 6' is located inside the cavity.

In the second embodiment, the lubricant is lubricating oil. A tube 73' is communicated with the upper end cap 761', and the other tube 73' is communicated with the lower end cap 761'. By these settings, the rolling elements 63' of the bearing 6' are immersed in the lubricating oil.

Although the density of the lubricating oil is slightly less than that of the water, and the pressure is proportional to the density and the depth, as the height difference between the lubricant storage tank 71' above the water surface and the underwater lubricant cavity 75' is relatively large, after calculation, in general, the lubricant cavity 75' is still in a state of "micro-positive pressure". In other words, even if the lower seal rings 72' cannot realize the sealing, the lubricant will also continually flow from the lubricant storage tank 71' into the lubricant cavity 75' due to the pressure difference action and then flows from the gap to the outside of the seal ring 72', and the outer water with sediments cannot flow into the lubricant cavity 75' from the gap, so that the protection for the center shaft 4 can be truly achieved.

To sum up, the tidal current energy generating device in the invention can allow the generating device to be modularly assembled and replaced above the water surface by disposing separable inner frames and the outer frame, such that the costs of maintenance and installation can be greatly reduced, thereby overcoming the difficulties that the conventional ocean energy generating device cannot be commercialized and large-scale. Further, by disposing at least two hydro turbines and at least three bearings on the center shaft, the "multipoint restriction" is achieved for the center shaft, which makes the scale of the tidal current energy generating device can be extended not only in the horizontal direction (the horizontal direction perpendicular to the water flow) but also in the vertical direction (the depth direction perpendicular to the horizontal plane), such that the power generation efficiency is greatly improved and the problem that the existing ocean energy generating devices cannot "be large" and "be deep" is solved.

In addition, the underwater shaft rotating protecting device provided by the invention can effectively protect the bearings from the outer impurities, especially preventing the sediments in the water from entering into the bearings, so as to effectively protect the normal operation of the bearings. By adopting the underwater shaft rotating protecting device, the tidal current energy generating device in the invention extends the service lives of the bearings, the maintenance frequency and maintenance costs are greatly reduced, and the power generating efficiency is ensured not to be affected at the same time. What's more, the bearings of the tidal current energy generating device provided by the invention can be rolling bearings, which overcomes the technical barrier that only sliding bearings with water as the lubricant can be used for an underwater shafting in the prior art.

Moreover, by setting the detection module, whether the sealing of the bearings is reduced or not can be known intuitively and timely, which effectively guides the maintenance personnel when and where to maintain, thereby improving the promptness and reliability of the maintenance. In addition, since the frame includes separable outer frame and inner frames, the underwater shaft rotating protecting device can be maintained or replaced conveniently and quickly, and the maintenance cost is greatly reduced.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of this invention is subject to the scope of the claims.

What is claimed is:

1. A tidal current energy generating device, comprising:
an outer frame;
at least one inner frame, separably disposed in the outer frame;
at least two hydro turbines, located below a water surface and disposed in the at least one inner frame, the at least two hydro turbines disposed coaxially, and the at least two hydro turbines being vertical-axis hydro turbines;
at least one center shaft, disposed through the at least two hydro turbines, an axis direction of the center shaft being perpendicular to a horizontal plane, and the center shaft rotating along with the rotating of the hydro turbines;
at least one generator, disposed above the water surface, the at least one generator being connected with one end of the center shaft; and
at least three bearings, sleeved on the center shaft, the at least three bearings located on two sides of the two hydro turbines and between the two hydro turbines, respectively.

2. The tidal current energy generating device according to claim 1, wherein the number of the hydro turbines is at least four, every two hydro turbines disposed coaxially is a group, at least two groups of the hydro turbines are disposed in one inner frame, and two neighboring hydro turbines are disposed axial-symmetrically to make rotating directions of the two hydro turbines to be reverse.

3. The tidal current energy generating device according to claim 1, further comprising an underwater shaft rotating protecting device, wherein the underwater shaft rotating protecting device comprises:

a lubricant storage tank, wherein a lubricant is stored and the lubricant storage tank is disposed above the water surface;
at least six seal rings, every two seal rings corresponding to one bearing and sleeved on the center shaft, a lubricant cavity being formed between every two seal rings and the corresponding bearing and the center shaft; and
a tube, one end of the tube communicated with the lubricant storage tank, and the other end communicated with the lubricant cavity.

4. The tidal current energy generating device according to claim 3, wherein the underwater shaft rotating protecting device further comprises a detection module disposed at the lubricant storage tank to detect whether the lubricant is reduced or not.

5. The tidal current energy generating device according to claim 3, wherein the bearing is a sliding bearing, and every lubricant cavity is formed by two seal rings, the bearings, and the center shaft.

6. The tidal current energy generating device according to claim 3, wherein the bearing is a rolling bearing, the underwater shaft rotating protecting device further comprises at least three bearing houses, and each lubricant cavity is formed by two seal rings, the bearing, the bearing house, and the center shaft.

7. The tidal current energy generating device according to claim 1, wherein the outer frame has a plurality of fixed piles, and the outer frame is fixed at a sea bottom through piling.

8. The tidal current energy generating device according to claim 1, wherein the outer frame has a plurality of reducing water flow resistance structures.

* * * * *